United States Patent Office 3,266,995
Patented August 16, 1966

3,266,995
SKIN DELUSTERING COLLOIDAL SILICA COMPOSITION AND METHOD
Monroe Lanzet, North Bergen, and Nathan A. Ziskin, Englewood, N.J., assignors to Yardley of London, Inc., a corporation of New Jersey
No Drawing. Filed July 10, 1962, Ser. No. 208,940
4 Claims. (Cl. 167—90)

The present invention is concerned with improvements in various forms of cosmetics, more specifically with improvements which yield a delustering effect when the finished cosmetic is applied.

As used herein, the term "make-up cosmetic" refers to a cosmetic consisting in substantial part of a vehicle which is an oil and water emulsion (with suitable emulsifying agents), or an oil and water mixture with polyols as cosolvents, or a blend of water and one or more polyols either with or without added emulsifiers. The term also includes combinations of the foregoing. The word polyol is used here to include monohydric alcohols and glycolethers as well as polyhydric alcohols. Such cosmetics frequently contain pigment or other coloring matter as well as such additives as perfumes, extenders, thinners, thickeners, film formers, antiseptics and the like. The foregoing list is, of course, illustrative and not limitative. Included within the foregoing definition are such cosmetics as are commonly called foundation make-up (medicated or otherwise), leg make-up and emulsion type eye make-up.

In the past, it has been customary in the use of make-up cosmetics to apply them to the skin and then dust on some face or body powder. The purpose of the latter was to eliminate the undesirable shine which resulted from the use of the basic cosmetic.

It is, therefore, among the objects of this invention to provide make-up cosmetics which, while suitable for application to the skin, do not require the second step of application of a powder or similar material.

It is also among the objects of this invention to provide a make-up cosmetic composition which is safe, effective and easy to apply.

It is further among the objects of this invention to provide a make-up cosmetic composition which even though it may be liquid or cream, nevertheless does not produce objectionable shininess upon application.

In practicing the present invention there is provided a make-up cosmetic which includes colloidal silica as an ingredient thereof. It has been found that the presence of this ingredient provides a delustering effect when the cosmetic is applied.

The silica should be present, for best results, in an amount ranging from 1.5% to 10.5% by weight of the make-up cosmetic. In many instances the maximum amount of silica is limited only by the gelation point of the particular composition. Since gelation is not desired because it interferes with the manufacture of some compositions of this sort, the amount of silica should preferably be kept below that point which will cause this effect. The extreme upper limit of silica concentration is governed by the mechanical difficulties inherent in the blending of make-up cosmetics which are very thick or gelled in consistency.

It has been found that particle size of the colloidal silica should be less than about 5 microns and preferable results are obtained in a range of 0.015 to 5 microns.

The most preferred concentration range is from 3.0 to 7.0% silica by weight.

Typical formulations of a make-up composition such as is indicated herein are as follows:

| Ingredients | Examples | |
|---|---|---|
| | 1 | 2 |
| Stearic Acid | 3.20 | 1.80 |
| Propylene Glycol Monostearate | 2.00 | 1.50 |
| Lanolin Alcohol | 1.80 | 1.50 |
| Sorbitan Sesquioleate | 0.50 | 0.50 |
| Propyl Paraben U.S.P | 0.10 | 0.10 |
| Isopropyl Myristate | 6.50 | 6.30 |
| Triethanolamine | 1.60 | 0.90 |
| Methyl Paraben U.S.P | 0.10 | 0.10 |
| Gum | 0.25 | 0.25 |
| Polyethylene Glycol 600 | 15.00 | 15.00 |
| Colloidal Silica | 3.00 | 7.00 |
| Kaolin | 0.75 | 0.75 |
| Titanium Dioxide | 8.50 | 8.50 |
| Iron Oxides | 1.50 | 1.50 |
| Water | 55.00 | 54.20 |
| Perfume | 0.50 | 0.50 |
| Comments | (1) | (2) |

[1] Fair to good delustering.
[2] Very good delustering.

As an indication of the variations permissible in silica concentration, the following formulas indicate the extremes to which one may go in preparing such compositions.

| Ingredients | Examples | |
|---|---|---|
| | 3 | 4 |
| Stearic Acid | 3.20 | 1.50 |
| Propylene Glycol Monostearate | 2.00 | 1.50 |
| Lanolin Alcohol | 1.80 | 1.00 |
| Sorbitan Sesquioleate | 0.50 | 1.00 |
| Propyl Paraben U.S.P | 0.10 | 0.10 |
| Isopropyl Myristate | 0.50 | 7.00 |
| Triethanolamine | 1.60 | 0.75 |
| Methyl Paraben U.S.P | 0.10 | 0.10 |
| Gum | 1.00 | |
| Polyethylene Glycol 600 | 15.00 | 15.00 |
| Colloidal Silica | 1.50 | 10.50 |
| Kaolin | 0.75 | |
| Titanium Dioxide | 8.50 | 8.50 |
| Iron Oxides | 1.50 | 1.50 |
| Demineralized Water | 61.95 | 51.55 |
| Perfume | 0.50 | 0.50 |
| Comments | (1) | (2) |

[1] Fair delustering.
[2] Excellent delustering.

While one of the more suitable oils used here in the compositions of the present invention is isopropyl myristate, nevertheless others of equal or even greater suitability may be substituted therefor. A typical composition for testing the effectiveness of various oils as part of the vehicle is as follows:

Example 5

Ingredient: (Percent by weight)
- Stearic acid _____ 3.20
- Propylene glycol monosterate _____ 2.00
- Lanolin alcohol _____ 1.80
- Sorbitan sesquioleate _____ 0.50
- Propyl paraben U.S.P. _____ 0.10
- Oil to be tested _____ 6.50
- Triethanolamine _____ 1.60
- Methyl paraben U.S.P. _____ 0.10
- Gum _____ 0.25
- Polyethylene glycol 600 _____ 15.00
- Colloidal slica _____ 3.00
- Kaolin _____ 0.75
- Titanium dioxide _____ 8.50
- Iron oxides _____ 1.50
- Water _____ 55.20
- Perfume _____ 0.50

The above formula was prepared using each of the following oils where indicated: Lauryl lactate, silicone, castor oil, oleyl alcohol, acetylated lanolin, liquid fraction of lanolin, perhydro squalene, isopropyl palmitate, isopropyl myristate, diisobutyl adipate and light mineral oil. Each of the foregoing oils produced satisfactory results when used in the above formula.

As an indication of the amount of oil which can be used in compositions of this kind, the following examples were prepared and gave results as indicated.

| Ingredients | Examples | |
|---|---|---|
| | 6 | 7 |
| | Percent by Weight | Percent by Weight |
| Stearic Acid | 1.80 | 1.80 |
| Propylene Glycol Monostearate | 1.40 | 1.40 |
| Lanolin Alcohol | 1.50 | 1.50 |
| Sorbitan Sesquioleate | 0.50 | 0.50 |
| Propyl Paraben U.S.P | 0.10 | 0.10 |
| Isopropyl Myristate | 3.00 | 12.00 |
| Oleic Acid | 1.40 | 1.40 |
| Triethanolamine | 1.60 | 1.60 |
| Methyl Paraben U.S.P | 0.10 | 0.10 |
| Gum | 0.25 | 0.25 |
| Polyethylene Glycol 600 | 15.00 | 15.00 |
| Colloidal Silica | 5.00 | 5.00 |
| Kaolin | 0.75 | 0.75 |
| Titanium Dioxide | 8.50 | 8.50 |
| Iron Oxides | 1.50 | 1.50 |
| Water | 57.60 | 48.60 |
| Perfume | 0.50 | 0.50 |
| Comments | (1) | (2) |

1 Delustering excellent. Emollience on skin fairly good.
2 Delustering fair. Emollience on skin excellent.

It has also been found that delustering will occur even if the isopropyl myristate (one of the more suitable oils) is present in amounts ranging from 0.5% to 18%. Generally speaking it is preferable to use greater quantities of colloidal silica in the presence of greater percentages of oil. Similarly the lower end of the oil concentration range may necessitate a reduction of the silica to as low as 1.5% by weight.

The compositions as set forth in Example 1 hereof was formulated using colloidal silicas ranging from 0.015 to 5.0 microns in average particle size, with varying but satisfactory results. The delustering efficiency decreases as the particle size increases so that it is often advisable to use greater quantities of silica at the upper end of the particle size range.

Example 8 is a typical leg make-up formulation and Example 9 is a typical eye make-up, both made in accordance with the present invention.

| Ingredients | Examples | |
|---|---|---|
| | 8 | 9 |
| | (Percent by weight) | (Percent by weight) |
| Stearic acid | 1.80 | 3.0 |
| Glyceryl Monostearate | | 2.0 |
| Propylene Glycol Monostearate | 1.40 | |
| Lanolin Alcohol | 0.45 | 1.8 |
| Mineral Oil, Light | 2.55 | |
| Isopropyl Myristate | | 5.0 |
| Diisobutyl Adipate | 6.00 | |
| Propyl Paraben U.S.P | 0.10 | 0.1 |
| Sorbitan Sesquioleate | 0.50 | 0.5 |
| Propylene Glycol U.S.P | | 10.0 |
| Polyethylene Glycol 600 | 5.00 | |
| Triethanolamine | 0.90 | 1.0 |
| Methyl Paraben U.S.P | 0.10 | 0.1 |
| Colloidal Silica | 5.00 | 5.0 |
| Cellulose Gum | 0.10 | |
| Titanium Dioxide | 8.80 | 4.0 |
| Red Iron Oxide | 0.30 | |
| Yellow Iron Oxide | 0.75 | |
| Brown Iron Oxide | 0.15 | |
| Ultramarine Blue | | 8.0 |
| Water | 66.10 | 59.5 |
| Perfume | q.s. | |
| Total | 100.00 | 100.0 |

Satisfactory delustering was obtained in both of the foregoing cases.

A non-emulsifier make-up product according to the present invention is shown in the following formula:

Example 10

Ingredients:
Polypropyleneglycol 200 _____ 15.00
Polyethyleneglycol 600 _____ 12.00
Titanium dioxide _____ 6.80
Iron oxides _____ 1.20
Zinc oxide U.S.P. _____ 2.00
Stearyl benzyl dimethyl ammonium
 chloride _____ 0.50
Water _____ 58.50
Colloidal silica _____ 3.50
Perfume _____ 0.50

Comments _____ Delustering very good.

As a further indication of the scope of the invention, a nonionic-cationic oil-in-water emulsion make-up is set forth as Example 11.

Example 11

Ingredients:
Kesscowax A–33 _____ 1.50
Isopropyl palmitate _____ 2.35
Lanolin _____ 0.80
Heavy mineral oil _____ 3.90
Emcol E–607S _____ 1.50
Glycerine _____ 5.00
Kaolin _____ 2.875
Titanium dioxide _____ 7.750
Iron oxides _____ 1.875
Ceron CN _____ 1.000
Water _____ 65.85
Colloidal silica _____ 5.00
Perfume _____ 0.50

Comments _____ Delustering excellent.

Kesscowax A–33 is an acid stable, nonionic, self-emulsifiable grade of glyceryl monostearate.
Emcol E–607S is a stearyl colamino formylmethyl pyridinium chloride quaternary ammonium emulsifier and conditioner.
Ceron CN is an etherified polymeric carbohydrate of cationic nature.

The number following the designations polyethylene or polypropylene refer to the mean molecular weight of polymer.

Although only a limited number of specific embodiments of this invention have been disclosed, it is nevertheless to be broadly construed and not to be limited except by the character of the claims appended hereto.

What is claimed is:

1. A method of treating the skin to deluster the surface thereof comprising applying to the skin a make-up cosmetic consisting of an oil and water emulsion, an organic solvent selected from the group consisting of monohydric alcohols, polyhydric alcohols and glycol ethers, and an extender, said make-up containing about 1.5% to 10.5% of colloidal silica sufficient to provide a delustering effect on the skin, the amount of said silica being less than that causing gelation of said make-up, the particle size being below about 5 microns.

2. A cosmetic for delustering the skin which consists of an oil and water emulsion, an organic solvent selected from the group consisting of monohydric alcohols, polyhydric alcohols and glycol ethers, and an extender, said make-up containing about 1.5% to 10.5 of colloidal silica sufficient to provide a delustering effect on the skin, the amount of said silica being less than that causing gelation of said make-up, the particle size being below about 5 microns.

3. A method according to claim 1 wherein said silica has an average particle size of from about 0.015 to 5 microns.

4. A method according to claim 1 wherein said silica is from 3.0% to 7.0% of said cosmetic by weight.

References Cited by the Examiner

UNITED STATES PATENTS

| | | | |
|---|---|---|---|
| 1,629,096 | 5/1927 | Davis | 167—91 |
| 2,829,112 | 4/1958 | Solomon | 252—358 |
| 2,894,913 | 7/1959 | Sullivan | 252—358 |

FOREIGN PATENTS 1,005,241  3/1957  Germany.

OTHER REFERENCES

Drug and Cos. Ind., 73:4, October 1953, pp. 466, 467.

Goodman, Cos. Dermatology, McGraw-Hill, New York, pages 352, 358, 359, 360.

Harry, Cosmetic Materials, Leonard Hill Ltd., London, 1st Ed., vol. 2, 1950, pp. 283–4.

Manufacturing Chemist, 31:4, April 1960, adv. A84.

Redgrove, Manuf. Chem., vol. 7, August 1936, pp. 277, 278, 281.

Redgrove, Manuf. Chem., vol. 4, March 1933, pp. 77–78.

Santocel Booklet, Monsanto Chem. Co., St. Louis, 1956, pp. 2, 4 and 5.

Thomessen, Modern Cosmetics, Drug and Cos. Ind., New York, 3rd Ed., 1947, pp. 48, 49.

JULIAN S. LEVITT, *Primary Examiner.*

FRANK CACCIAPAGLIA, JR., *Examiner.*

ANNA FAGELSON, VERA C. CLARKE,
*Assistant Examiners.*